United States Patent [19]

Zitz et al.

[11] Patent Number: 5,000,306
[45] Date of Patent: Mar. 19, 1991

[54] CHAIN CONVEYOR FOR LOADING DEVICES AND/OR CONVEYING DEVICES

[75] Inventors: Alfred Zitz; Arnulf Kissich, both of Zeltweg; Erich Brandl, Grosslobming, all of Austria

[73] Assignee: Voest-Apline Maschinenbau Gesellschaft m.b.H., Linz, Austria

[21] Appl. No.: 396,720

[22] Filed: Aug. 22, 1989

[30] Foreign Application Priority Data

Aug. 23, 1988 [AT] Austria .................. 2081/88

[51] Int. Cl.⁵ .............................................. B65G 65/06
[52] U.S. Cl. .................................. 198/516; 198/520; 198/732
[58] Field of Search .................. 198/516, 520, 732; 299/64–67

[56] References Cited

U.S. PATENT DOCUMENTS

| 1,001,914 | 8/1911 | Wheeler | 198/732 |
| 1,232,051 | 7/1917 | Kuhn | 198/732 |
| 2,014,079 | 9/1935 | Cartlidge | 198/520 |
| 2,113,733 | 4/1938 | Kraft | 198/516 |
| 3,159,265 | 12/1964 | Kovacs | 198/516 |
| 3,627,106 | 12/1971 | Winfield | 198/732 |
| 3,921,785 | 11/1975 | Huitink | 198/516 |

FOREIGN PATENT DOCUMENTS 80172845 12/1985 Fed. Rep. of Germany .
1126674 11/1956 France ................. 198/516

Primary Examiner—Joseph E. Valenza
Attorney, Agent, or Firm—Cushman, Darby & Cushman

[57] ABSTRACT

In a chain conveyor (6) for loading devices and/or conveying devices, in which engaging pieces (10) are swivelably linked to a chain (9), noting that the engaging pieces (10) are linked to the chains approximately at their longitudinal center and the chain (9) moves along a path closed in itself, the engaging pieces (10) are at their arms (14) facing the inner side of the orbital path of the chain (9) articulatedly linked to a respective guide rod (15), said guide rod (15) being articulatedly linked with the chain (9) for lagging in direction of movement of the chains. In this case, the chain (9) is preferably guided within a recess or groove (18) of the sliding surface of the engaging pieces (10), said recess or groove corresponding to the orbital path.

13 Claims, 3 Drawing Sheets

CHAIN CONVEYOR FOR LOADING DEVICES AND/OR CONVEYING DEVICES

BACKGROUND OF THE INVENTION

1. Field of the Invention

The invention refers to a chain conveyor for loading devices and/or conveying devices in which engaging pieces are swivelably linked to a chain, noting that the engaging pieces are linked to the chains approximately at their longitudinal center and the chain moves along a path closed in itself.

2. Description of the Prior Art

Chain conveyors of the initially mentioned type are frequently also designated as wing conveyors, and there are known arrangements in which chain wings or engaging pieces, respectively, are hingedly arranged on chains being driven by deflection wheels and are deflected thereby. The engaging pieces are in most cases designed as scrapers which cooperate with a sliding surface or, respectively, a trough for the purpose of conveying the material resting on the sliding surface or the trough, respectively. In principle, there have become known two arrangements differing in the effective length of the engaging pieces. In case of central-chain conveyors, there protrudes at both sides of the chain one arm each of the engaging piece. Such arrangements are most frequently used for removal conveyor means and are only limitedly suitable for travelling along sharp curves of a conveying path. German Utility Model Patent No. 80 17 284.5 has proposed loading devices, in particular, an arrangement in which only one arm of the scraper or, respectively, wing laterally protrudes from the chain, so that also sharp curves of a conveying path can be travelled along. It is in particular when arranging such a chain conveyor as a loading conveyor on loading ramps of a drift advancing machine or excavating machine that it is possible on account of such an arrangement to remove the material from a relatively great surface area. Within the deflection area there results, however, in such an arrangement a pronounced acceleration of the outer edge of the scrapers or, respectively, the wings and in those cases in which the material is transferred from a loading conveyor onto a subsequent removal conveyor within the area of the chain deflection, the acceleration of the material results in an uncontrolled transfer of the material onto the subsequent removal conveyor. Furthermore, the effective width and, respectively, the clearable surface is limited in case of such an one-wing design of the scrapers.

SUMMARY OF THE INVENTION

The invention now aims at improving a chain conveyor of the initially mentioned type such that the effective clearable surface is increased and the material is not accelerated in an undesired manner also within the transfer area at the area of deflection locations of the chains. For solving this task, the inventive design of the chain conveyor comprises the feature that the engaging pieces are at their arms facing the inner side of the orbital path of the chains articulatedly linked to a respective guide rod, said guide rod being articulatedly linked with the chain for lagging in direction of the movement of the chains. On account of the engaging pieces being designed as two-armed engaging pieces and on account of the chain conveyor being thus designed like a central chain conveyor, the effective width, which is covered by the engaging pieces and can be utilized for clearing or removing the material, is distinctly increased. Because there is now provided a guide rod, which is articulatedly linked with the chain for lagging in direction of movement of the chain and which has its free arm articulatedly acting on that side of the arms which is facing the inner side of the orbital path of the chains, the engaging pieces are swivelled within the deflection area of the chains, said swivelling movement taking place such that the outer end of the engaging pieces is, at such deflection areas, swivelled back in opposite direction of the direction of movement of the chains. This circumstance has as a result that any undesired acceleration of the material is prevented at the area of the ends of such engaging pieces, and the inclined position of the engaging pieces within a deflection area facilitates the transfer of great amounts of material onto subsequent removal conveyor means.

In this case and according to a preferred further development of the invention, the arrangement is selected such that the chain is guided within a recess or groove, which corresponds to the orbital path, of the sliding surface for the engaging pieces. In such an arrangement, there remains a surface area which is free of driving stars and deflection stars for the chains and which can as a whole be covered by the engaging pieces, so that the clearing effect can be improved. Such an arrangement is of particular advantage in particular or loading ramps of short constructional length which can, in this manner, nearly completely and reliably be cleared. The material arriving on such loading ramps is transported to a removal conveyor means over the total free surface also of loading ramps of short constructional length, so that there is reliably obtained a high conveyor capacity with simultaneous small space requirement of the loading ramp. In this case, the arrangement is advantageously selected such that the engaging pieces and/or the guide rods are cooperating via trunnions or rollers with the edges of the recess or groove, so that any wear is substantially reduced. The wear of the chain and of the drive means is substantially reduced, because the chain is not impact-like stressed by the incoming material on account of being located in a protected manner within a groove and because also the elements of the drive means are arranged in a protected manner below that surface with which cooperate the scrapers or engaging pieces, respectively.

In such an arrangement it is possible to use a chain of simple design which need only be bendable in one direction. In this manner, it is possible to use particular stable chains of narrow width, noting that the arrangement is preferably selected such that the chain is designed as an uniaxially swivelable chain, the swivelling axes of which are oriented in normal relation to the direction of movement and in parallel relation to the swivelling axis of the engaging pieces on the chain. For the purpose of retarding the outer edge of the engaging pieces at the deflecting area of the chains, in particular at the transfers area onto a subsequent conveyor, the guide rods can, in case of such uniaxially swivelable chains, swivelably act on the free ends of the inwardly protruding arms of the engaging pieces via an axis extending parallel to the swivelling axis for the engaging pieces on the chain so that there can simultaneously reliably be resisted tilting loads and in particular forces tending to move the chain in an oblique position. In this case, the chain tension is not excessively increased also under load, thereby further reducing the wear, noting that simultaneously the conveyor capacity is increased on account of the scraper elements extending beyond the chain at both of its sides.

In this case, the chains can be guided within the recess or groove of the sliding surfaces of the engaging pieces along an oval path, so that even loading ramps of particularly short constructional length can reliably be cleared over their total lateral length.

For the purpose of reducing the acceleration of the free ends of the engaging pieces, which acceleration occurs in case of engaging pieces being not provided with a guide rod construction, in a degree desired for a reliable transfer onto subsequent removal conveyor means, the arrangement is selected advantageously such that the length of the guide rods is greater than the length of the inwardly protruding arms of the engaging pieces in transverse relation to the direction of movement of the chain. A reliable reduction of the outer circumferential speed of the ends of the engaging pieces within the transfer area also results from the feature that the radius of curvature of the orbital path of the chain is smaller than the length of the guide rods, whereby the wings or, respectively, the engaging pieces are backwardly swivelled within the transfer area to such an extent that they are capable to shift nearly over their total width the transported material onto subsequent removal conveyors.

The inventive design of the chain conveyor or, respectively, wing conveyor is particularly suitable for loading ramps of short constructional length in longitudinal direction of the machine, to which loading ramps are, as a rule, connected central removal conveyor means extending in longitudinal direction of the machine. In this case, the arrangement is preferably selected such that, in a loading conveyor, the longer axis of the orbital path is arranged in transverse relation to the longitudinal axis of a removal conveyor means being connected in substantially tangential relation to the curved portion of the orbital path of the engaging pieces.

In this case, each engaging piece or, respectively, scraper is maintained in the most favourable transfer position also within the area of reversal of the scrapers and over a great swivelling area by means of the guide rod, noting that, with simultaneously increased conveying capacity, the chain wear and the danger of tilting the chain and thus

BRIEF DESCRIPTION OF THE DRAWING

In the following, the invention is further explained with reference to an example of embodiment shown in the drawing.

DETAILED DESCRIPTION OF THE PREFERRED EMBODIMENT

Figure 1:
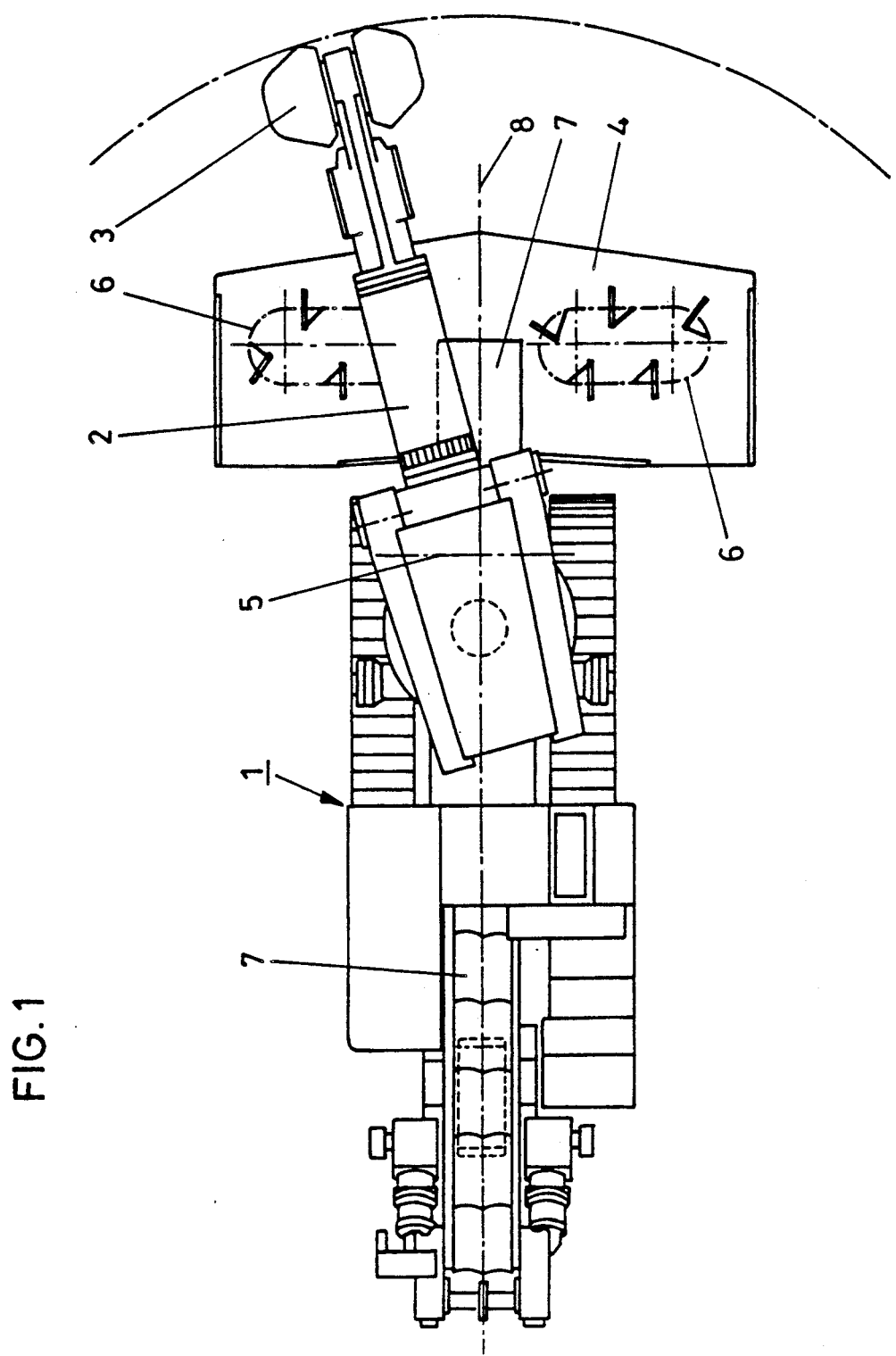
FIG. 1 shows a top plan view of a drift advancing machine or excavating machine together with a schematical representation of an inventive chain conveyor in the loading ramp.

In FIG. 1, there is designated by the reference numeral 1 the frame of a drift advancing machine or excavating machine, noting that a cutting arm 2 comprising cutting heads 3 is linked to this frame for being universally swivelled. In place of the universally swivelable cutting arm 2 having the cutting head 3, there can also be provided a cutting arm being movable only in vertical direction and comprising a cutting roll extending over the whole width of the drift face. Below the cutting arm 2, there is located a loading ramp 4 which is swivelably linked to the frame of the drift advancing machine or excavating machine for being swivelable in height direction around a horizontal axis schematically indicated by the reference numeral 5. In the loading ramp 4, there are provided chain conveyors 6 to be further explained later with reference to FIGS. 2 and 3, the chain conveyors transporting cut material received by the loading ramp 4 to a conveyor belt or scraper conveyor 7 extending substantially in longitudinal direction of the machine.

Figure 2:
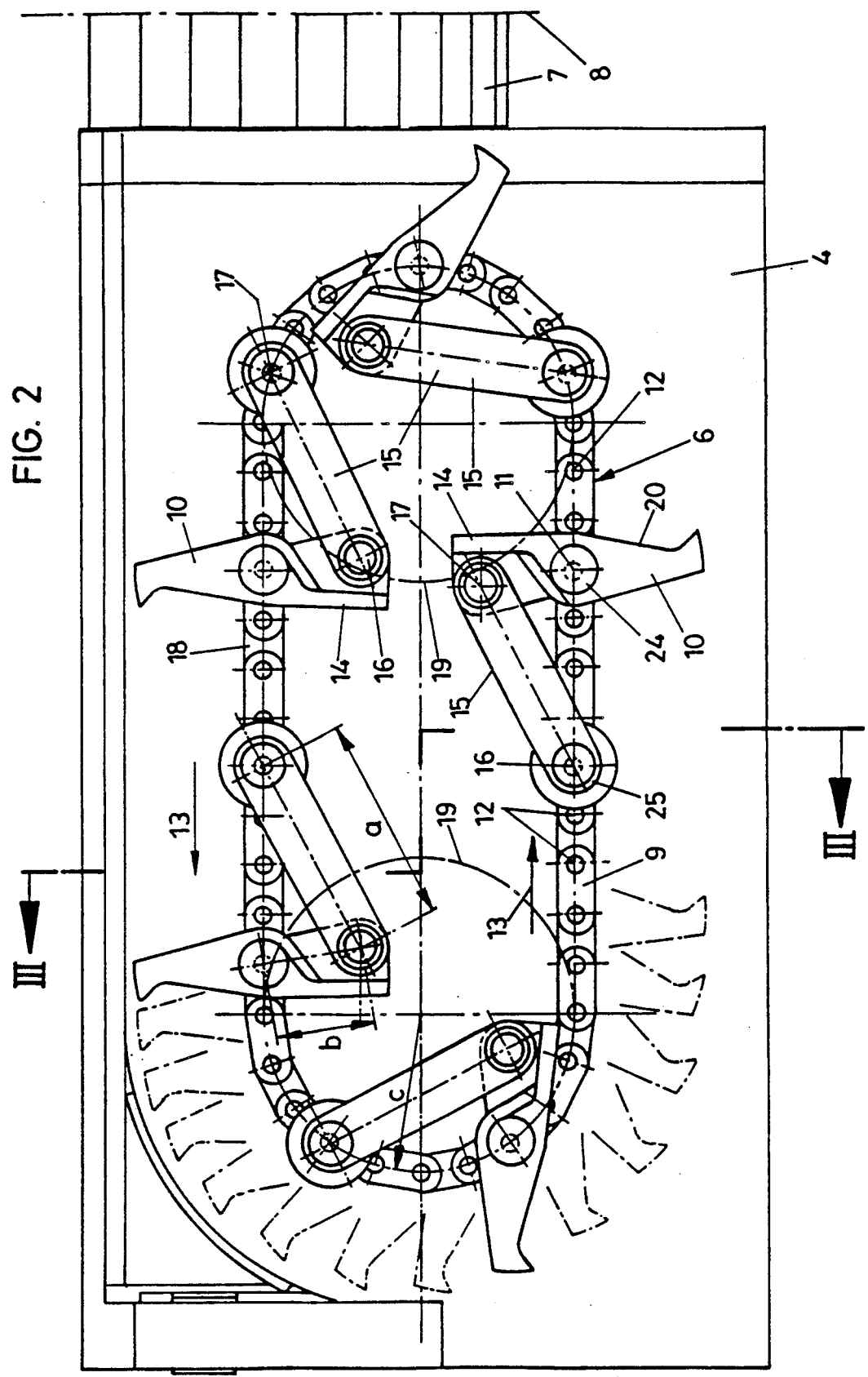
FIG. 2 shows in an enlarged scale a partial top plan view of the loading ramp of FIG. 1 comprising the chain conveyor according to the invention.

In the representation according to FIG. 2, there is only shown in a greater scale one half of the loading ramp 4 comprising a chain conveyor 6. The scraper conveyor or, respectively, the conveyor belt extending in longitudinal direction of the machine, is again designated by the reference numeral 7. The longitudinal direction of the machine is designated by the reference numeral 8, noting that the loading ramp 4 is, for completing same, symmetrically designed relative to said center line 8. The chain conveyor used for transporting the cut material away from the loading ramp 4 is generally designated by the reference numeral 6 and has a uniaxially swivelable chain 9 on which chain are swivelably supported engaging pieces 10 approximately at their longitudinal center for being swivelable around axes 11 on the chain. The swivelling axes 11 of the engaging pieces or, respectively, wings of the chain conveyor extend in this case in parallel relation to swivelling axes between the individual chain links and substantially in normal relation to the direction of movement of the chain, which direction is indicated by reference numeral 13. Furthermore, the engaging pieces 10 are with their arms 14 extending in direction to the inner side of the orbital path of the chain 9, each articulatedly connected with guide rods 15, said guide rods being again articulatedly connected with the chain 9 in a lagging manner, noting that the swivelling axes for articulatedly connecting the guide rods to the chain and, respectively, to the arms 14 of the engaging pieces 10 are designated by the reference numerals 16 and 17. The swivelling axes 16 and 17 extend, in this case, in parallel relation to the swivelling axis 11 of the engaging pieces 10 on the chain 9. The chain 9 is guided substantially along an oval path within a recess or groove 18, respectively, provided, as can more clearly be derived from FIG. 3, in the surface of the loading ramp and representing the sliding surface of the engaging pieces 10. The engaging pieces 10 as well as the guide rods 15 are guided within the recess or groove 18, respectively, by means of trunnions or rollers 24 and 25 for the purpose of reducing the wear and the stress.

In FIG. 2, there are further shown in dashed lines deflection discs 19 for the chain 9 and it is clearly visible that, on the one hand, the length a of the guide rods 15 is greater than the length b of the arms 14 of the engaging pieces 10 as seen in transverse direction to the direction of movement of the chain and that, on the other hand, the radius of curvature, defined by the deflection discs 19 and being designated by c, of the orbital path of the chain 9 is smaller than the length a of the guide rods. The length a of the guide rods is given such a size that the engaging pieces 10 extend, together with their conveying surface 20, within the straight sections of the oval path of the chain 9, substantially in normal relation to the direction 13 of movement. On account of the above-mentioned relations between the length of the guide rods 15 and the radius of curvature of the orbital path of the chain and the length of the arms 14 of the engaging pieces 10 as seen in transverse relation to the direction of movement of the chain, there is obtained within the curved portion of the orbital path and over the whole length of the engaging pieces a more uniform profile of circumferential velocity on account of the fact that the conveying surface 20 of the engaging pieces 10 no more extends in normal relation to the direction of movement on account of the whole engaging piece 10 being swivelled around the axis 11 and that those ends of the engaging pieces, which are outwardly located at a great distance from the swivelling axis 11, are, in the curved area, not imparted the full circular acceleration on account of the oblique position of the engaging pieces, as this is shown in dashed lines in the left-hand part of FIG. 2 for some positions of one engaging piece 10. On account of the oblique position of the outwardly protruding ends of the engaging pieces 10, it is possible to avoid any excessive acceleration of the transported material within the area of transfer onto the removal conveyor 7. On account of the design of the engaging pieces 10, which are articulated to the chain 9 approximately at their longitudinal center and are brought into an inclined position within the area of transfer onto the removal conveyor 7 for the purpose of avoiding excessive accelerating forces on the rock, it is thus possible to effect the transfer in a substantially simplified manner with reduced dust formation and it is simultaneously possible to use, with high travelling speed of the chain conveyor, a loading ramp having, as seen in longitudinal direction of the machine, a relatively short length and being arranged with relatively strong inclination.

Figure 3:
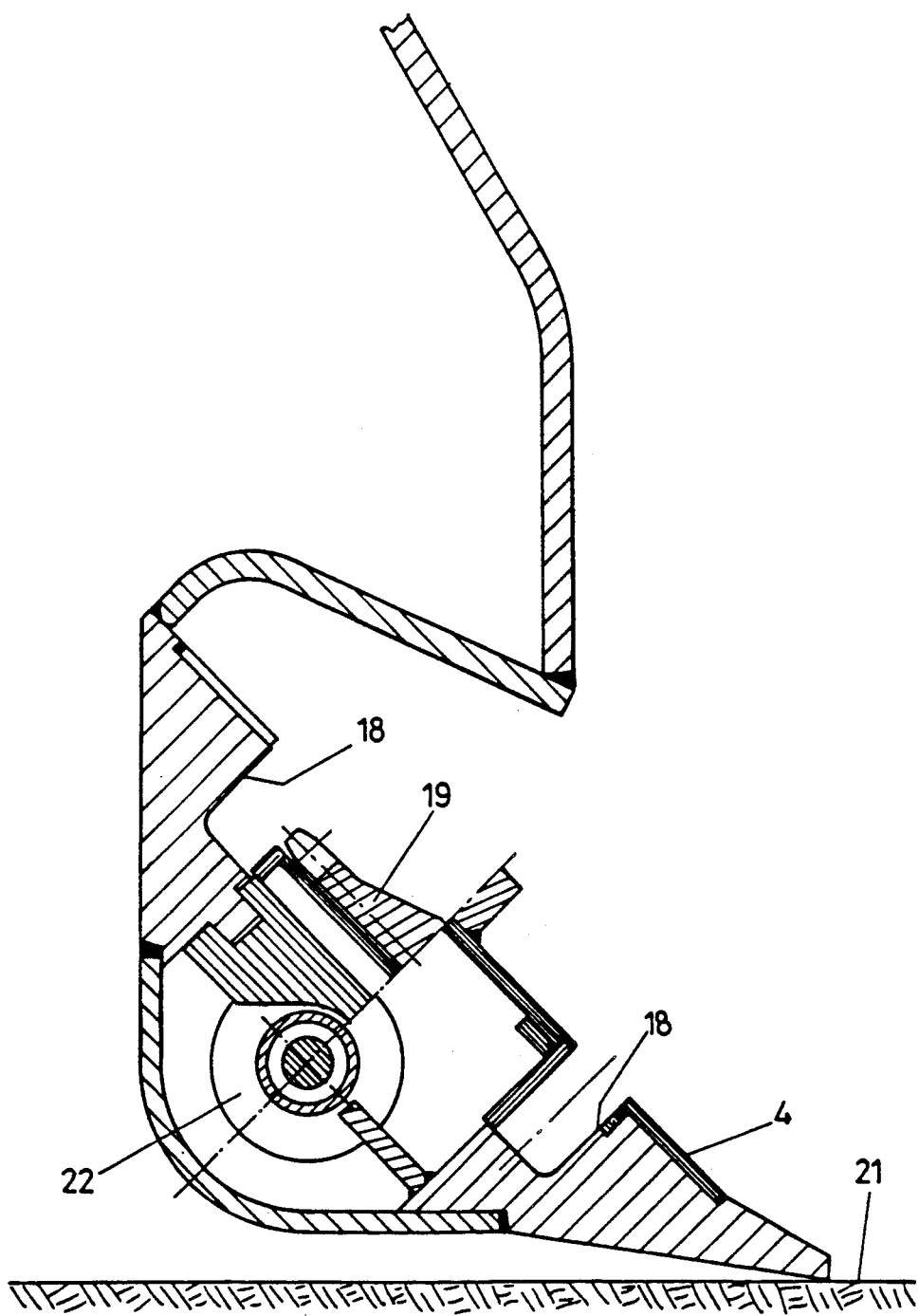
FIG. 3 shows a section along line III—III of FIG. 2.

In the section through the loading ramp shown in FIG. 3, the recess 18 is clearly visible which serves as a guide means for the chain 9. For clarity sake, the chain and the engaging pieces and guide rods taken along by the chain are not shown in FIG. 3. The loading ramp 4 rests on the drift floor 21. In FIG. 3, there is schematically shown part of a deflection disc 19, as well as a drive pinion 22, for moving the chain 9, shown below said deflection disc. Such a drive means can, for example, be coupled in a known manner with the drive means of the removal conveyor 7. From FIG. 3, there results clearly the short construction of the loading ramp 4. On account of guiding the chain 9 within the recess or, respectively, groove 18 of the loading ramp it becomes possible to prevent in a simple manner any tilting of the conveyor chain and any jamming of the chain resulting therefrom.

What is claimed is:

1. A chain conveyor of bulk material for at least one of loading devices and conveying devices, in which a plurality of engaging pieces are swivelably linked to a chain, said engaging pieces being linked to the chain approximately at a longitudinal center of each engaging piece and the chain moving along a closed path, wherein the plurality of engaging pieces each have an arm facing the inner side of the closed path of the chain and articulatedly linked to a respective guide rod, said guide rod being articulatedly linked with the chain for lagging in direction of movement of the chain, said chain and plurality of engaging pieces moving in one of a plane in which material is conveyed and a plane parallel to a plane in which material is conveyed.

2. A chain conveyor as claimed in claim 1, wherein the chain is guided within one of a recess and groove, which corresponding to the path followed by the plurality of engaging pieces as they slide over a surface.

3. A chain conveyor as claimed in claim 1, wherein at least one of the plurality of engaging pieces and the guide rods cooperate via one of trunnions and rollers with edges of one of the recess and groove.

4. A chain conveyor as claimed in claim 1, 2 or 3, wherein the guide rods swivelably act on the free ends of the arms of the plurality of engaging pieces via an axis extending parallel to a swivelling axis of each of the plurality of engaging pieces.

5. A chain conveyor as claimed in claim 4, wherein the chain is designed as an uniaxially swivelable chain, with swivelling axes being oriented normal to a direction of movement and parallel to the swivelling axis of each engaging pieces on the chain.

6. A chain conveyor as claimed in claim 2 or 3, wherein the chain is guided along an oval path within one of the recess and groove of the surface.

7. A chain conveyor as claimed in claims 1, 2 or 3 wherein a length of each guide rod is greater than a length of each arm of the plurality of engaging pieces as seen transverse to a direction of movement of the chain.

8. A chain conveyor as claimed in claims 1, 2 or 3, wherein a radius of curvature of the path of the chain is smaller than a length of the guide rods.

9. A chain conveyor as claimed in claims 1, 2 or 3, wherein in a loading conveyor, a longer axis of the path is arranged transverse to a longitudinal axis of a removal conveyor means connected substantially tangential to a curved portion of the path of the plurality of engaging pieces.

10. A chain conveyor as claimed in 5, wherein the chain is guided along an oval path within one of the recess and groove of the surface.

11. A chain conveyor as claimed in claim 5, wherein a length of each guide rod is greater than a length of each arm of the plurality of engaging pieces as seen transverse to a direction of movement of the chain.

12. A chain conveyor as claimed in claim 5, wherein a radius of curvature of the path of the chain is smaller than a length of the guide rods.

13. A chain conveyor as claimed in claim 5, wherein in a loading conveyor, a longer axis of the path is arranged transverse to a longitudinal axis of a removal conveyor means connected substantially tangential to a curved portion of the path of the plurality of engaging pieces.

* * * * *